US008875833B2

(12) United States Patent
Kouma et al.

(10) Patent No.: US 8,875,833 B2
(45) Date of Patent: Nov. 4, 2014

(54) UTILITY VEHICLE

(71) Applicant: Kawasaki Jukogyo Kabushiki Kaisha, Hyogo (JP)

(72) Inventors: Yuji Kouma, Takasago (JP); Taisuke Morita, Amagasaki (JP); Ayumi Hamada, Akashi (JP); Seiji Itoo, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/731,375

(22) Filed: Dec. 31, 2012

(65) Prior Publication Data

US 2014/0187376 A1 Jul. 3, 2014

(51) Int. Cl.
*B60K 23/08* (2006.01)

(52) U.S. Cl.
CPC .................................... *B60K 23/08* (2013.01)
USPC ......................................... 180/233; 74/665 A

(58) Field of Classification Search
USPC ......................................... 180/233; 74/665 A
See application file for complete search history.

(56) References Cited

U.S. PATENT DOCUMENTS 5,720,688 A * 2/1998 Wilson et al. ................. 475/221
5,884,721 A * 3/1999 Lee .............................. 180/247
6,601,668 B2 * 8/2003 Kitai et al. .................... 180/233
6,620,073 B2 * 9/2003 Kazaoka et al. .............. 475/231
7,665,564 B2 * 2/2010 Smith et al. ................... 180/233
7,873,457 B2 * 1/2011 Christofl et al. ................ 701/67
2002/0112554 A1 * 8/2002 Tarui et al. ...................... 74/335
2013/0167681 A1 * 7/2013 Kii et al. .................... 74/473.12

FOREIGN PATENT DOCUMENTS

JP 4309781 5/2009

* cited by examiner

*Primary Examiner* — Kevin Hurley
(74) *Attorney, Agent, or Firm* — Wenderoth, Lind & Ponack, L.L.P.

(57) ABSTRACT

A utility vehicle 1 prevents a size increase of a transmission while ensuring a predetermined inter-shaft distance between an output shaft and a rear axle. The utility vehicle 1 is capable of switching a two wheel drive mode for transmitting drive force to rear wheels 3 and a four wheel drive mode for transmitting the drive force to front wheels 2 and the rear wheels 3, a transmission 9 includes an input shaft 92 to which the drive force from an engine 8 is inputted, a front wheel drive output shaft 94 for transmitting the drive force of the input shaft 92 to the front wheels 2, and a rear axle 96 for transmitting the drive force of the input shaft 92 to the rear wheels 3. A rear wheel drive output shaft 95 is provided in a motive power transmission route between the front wheel drive output shaft 94 and the rear axle 96.

10 Claims, 6 Drawing Sheets

FRONT
RIGHT
22
23
222
231
92
211
92a
221
93
94
94a
93a
95a
95
97
9
97a
91a
971
972

UTILITY VEHICLE

BACKGROUND OF THE INVENTION

1. Field of the Invention

The present invention relates to a utility vehicle capable of switching a two wheel drive mode for transmitting drive force to rear wheels and a four wheel drive mode for transmitting the drive force to front wheels and the rear wheels.

2. Description of the Related Art

Conventionally, in a utility vehicle capable of switching a two wheel drive mode and a four wheel drive mode, in a transmission for transmitting drive force from an engine, for example, as disclosed in Japanese Patent No. 4309781, an output shaft for outputting the drive force from the engine is provided, and motive power is transmitted from the output shaft to front wheels and rear wheels.

SUMMARY OF THE INVENTION

In a case where a predetermined inter-shaft distance is provided between the output shaft and a rear axle, in order to obtain a predetermined reduction ratio or strength, there is a need for increasing a diameter of a gear provided in the output shaft and a diameter of a gear provided in the rear axle. As a result, a problem that size of the transmission is increased is generated.

An object of the present invention is to provide a utility vehicle capable of preventing a size increase of a transmission while ensuring a predetermined inter-shaft distance between an output shaft and a rear axle.

In order to achieve the above object, the present invention is a utility vehicle capable of switching a two wheel drive mode for transmitting drive force to rear wheels and a four wheel drive mode for transmitting the drive force to front wheels and the rear wheels, wherein a transmission includes an input shaft to which the drive force from an engine is inputted, a front wheel drive output shaft for transmitting the drive force of the input shaft to the front wheels, and a rear axle for transmitting the drive force of the input shaft to the rear wheels, and a rear wheel drive output shaft is provided in a motive power transmission route between the front wheel drive output shaft and the rear axle.

According to the above configuration, by further separately providing the rear wheel drive output shaft for the rear wheels between the front wheel drive output shaft and the rear axle, while ensuring the predetermined inter-shaft distance between the front wheel drive output shaft and the rear axle, a gear diameter of a gear group provided in the front wheel drive output shaft and a gear diameter of a gear group provided in the rear wheel drive output shaft can be decreased. As a result, a size increase of the transmission can be prevented.

The present invention preferably further includes the following configurations.

(1) A two-wheel-four-wheel drive switching device for freely coupling and decoupling the front wheel drive output shaft and a front wheel propeller shaft for driving the front wheels is provided.

(2) In the above configuration (1), the two-wheel-four-wheel drive switching device is attached to a side part of a transmission case and electrically activated based on a command of a driver.

(3) In the above configuration (1), the front wheel drive output shaft and the two-wheel-four-wheel drive switching device are provided so as to be placed in front of rear wheel support arms of the utility vehicle.

(4) A final reduction mechanism is provided in the rear axle, and a differential lock device is provided in the final reduction mechanism.

(5) In the above configuration (4), the engine and the transmission are formed as separate bodies, and the input shaft, the front wheel drive output shaft, the rear wheel drive output shaft, and the final reduction mechanism are accommodated in the transmission case.

The above configuration (1) is a specific configuration of two-wheel-four-wheel drive switching. According to the present configuration, the two-wheel-four-wheel drive switching can be easily performed.

According the above configuration (2), by providing the two-wheel-four-wheel drive switching device in the vicinity of the transmission case, in comparison to a case where the switching device is provided in the vicinity of the front wheels, equipment relating to the switching device can be concentrated in the vicinity of the transmission. As a result, the equipment can be easily arranged. Since the two-wheel-four-wheel drive switching device is electrically activated, the two-wheel-four-wheel drive switching can be easily performed in comparison to manual activation.

According to the above configuration (3), contact between the front wheel drive output shaft and the two-wheel-four-wheel drive switching device, and the rear wheel support arms can be prevented.

According to the above configuration (4), by the differential lock device, the differential of the rear wheels is fixed, so that idling of the rear wheels at the time of no load can be prevented.

According to the above configuration (5), by accommodating the shafts and the final reduction mechanism of the rear axle in the transmission case, the shafts and the like can be compactly arranged.

In sum, according to the present invention, a utility vehicle capable of preventing a size increase of the transmission while ensuring the predetermined inter-shaft distance between the output shaft and the rear axle can be provided.

DETAILED DESCRIPTION OF THE INVENTION

Figure 1:
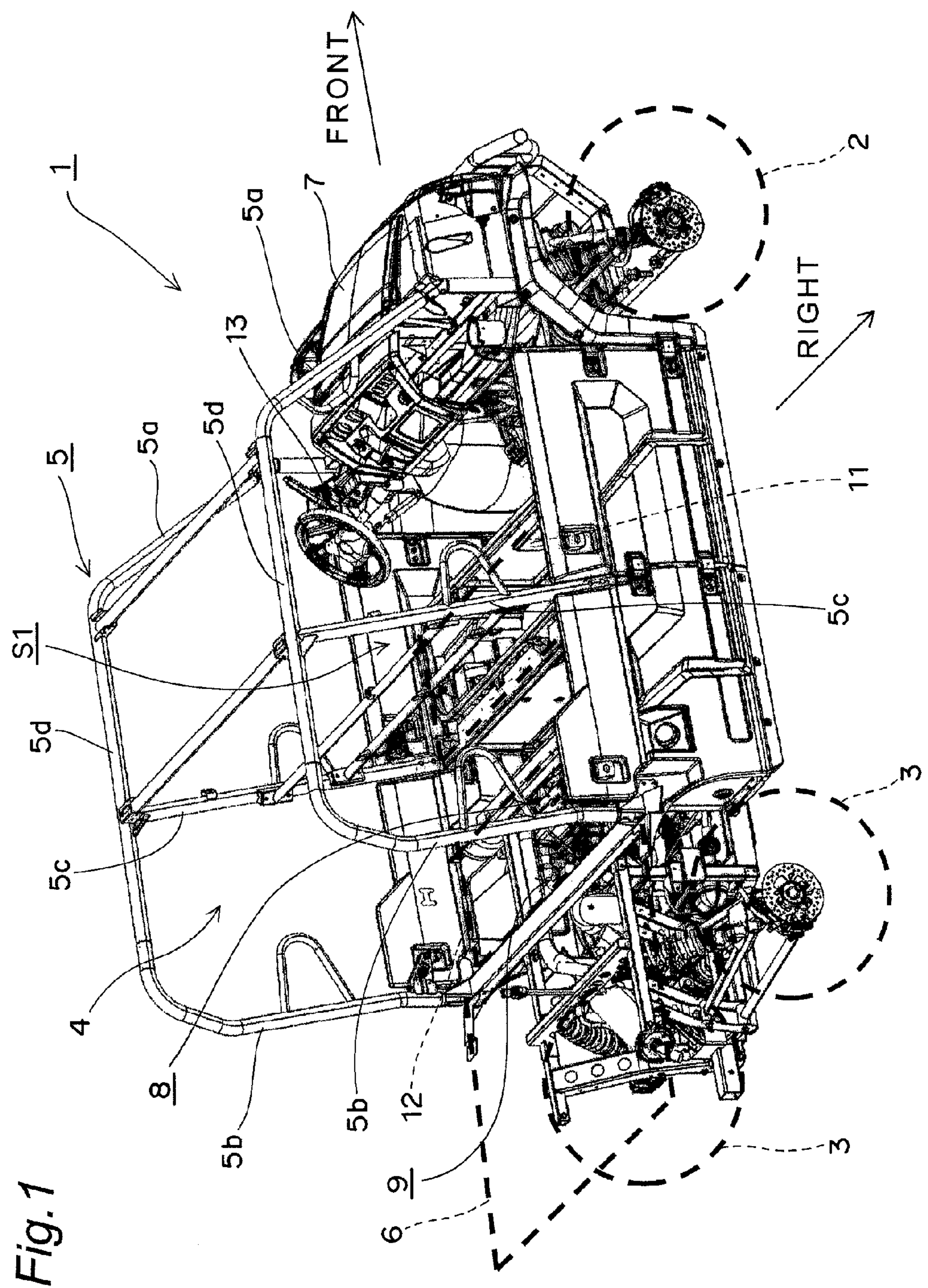
FIG. 1 is a schematic perspective view of a utility vehicle according to an embodiment of the present invention.

FIG. 1 is a schematic perspective view of a utility vehicle according to an embodiment of the present invention. It should be noted that in the following description, a concept of the direction used in the present embodiment matches with a concept of the direction seen from a driver of the utility vehicle. It should be noted that some members are transparently shown by broken lines in FIG. 1.

[Entire Structure of Vehicle]

As shown in FIG. 1, a utility vehicle 1 is provided with a pair of left and right front wheels 2 in a front part of a vehicle body, a pair of left and right rear wheels 3 in a rear part of the vehicle body, and a riding space (cabin) 4 between the front wheels 2 and the rear wheels 3. The riding space 4 is surrounded by a ROPS 5. The ROPS 5 is an abbreviation of a rollover protective structure serving as a part of a vehicle body frame and is provided with a pair of left and right front vertical members 5*a*, a pair of left and right rear vertical members 5*b*, a pair of left and right intermediate vertical members 5*c* arranged between the front vertical members 5*a* and the rear vertical members 5*b*, and a plurality of upper end beam members 5*d* for coupling upper ends of the vertical members 5*a*, 5*b*, 5*c*. A cargo bed 6 is provided behind the riding space 4, and a bonnet 7 is provided in front of the riding space 4. A bench type front seat 11 is installed in a front half part of the riding space 4, and a bench type rear seat 12 is installed in a rear half part of the riding space 4. A left seating area S1 of the front seat 11 is a driver seat, and an operation portion such as a handle 13 is provided in front of the left seating area S1.

Figure 2:
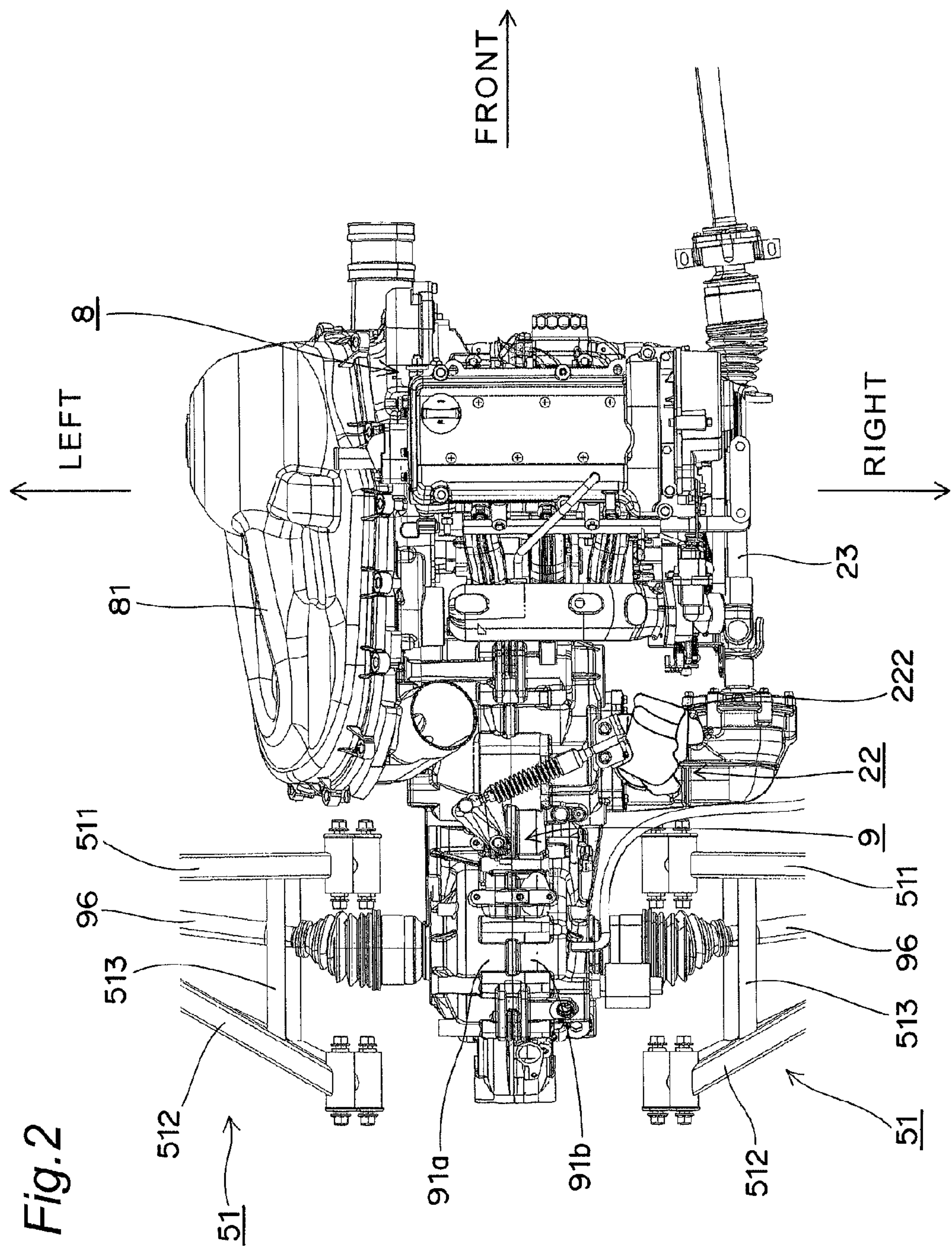
FIG. 2 is a top view of parts of an engine and a transmission.

An engine 8 is arranged below the rear seat 12, and a transmission 9 for converting and transmitting drive force from the engine 8 to the wheels is arranged behind the engine 8. FIG. 2 is a top view of parts of the engine 8 and the transmission 9. As shown in FIG. 2, the engine 8 and the transmission 9 are formed as separate bodies from each other and coupled by a coupling bracket, and the drive force of the engine 8 is transmitted to the transmission 9 by a belt converter 81 attached to a left side surface of the engine 8 and a left side surface of the transmission 9. The belt converter 81 is a V-belt type continuously variable transmission of automatically varying speed in accordance with rotation speed of the engine 8 and an increase/decrease of a load on the wheel side.

Figure 3:
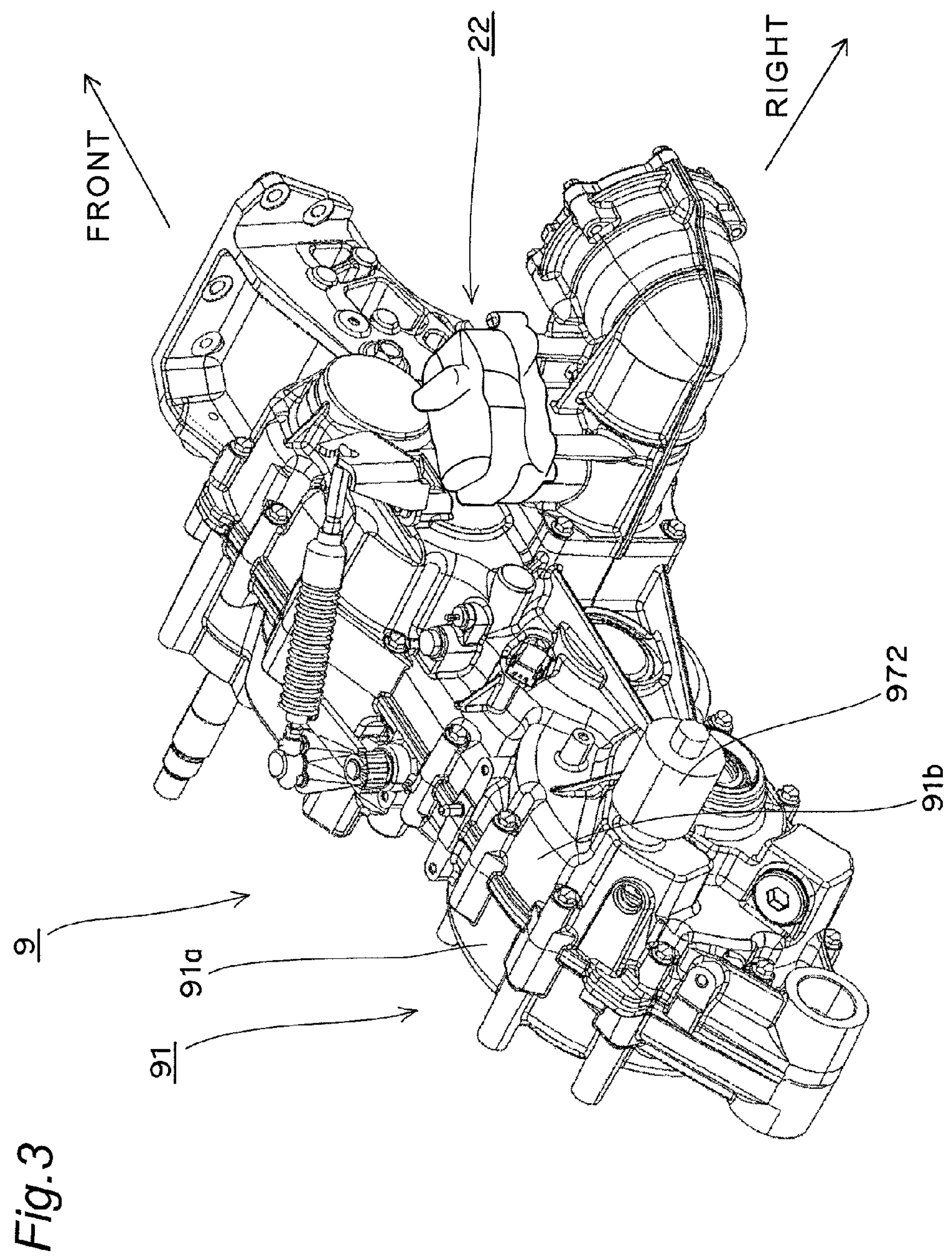
FIG. 3 is a perspective view of the transmission.

FIG. 3 is a perspective view of the transmission 9. As shown in FIG. 3, a transmission case 91 forming an outer form of the transmission 9 is made by combining a pair of left and right mission case members 91*a*, 91*b* on mating surfaces in the center.

Figure 4:
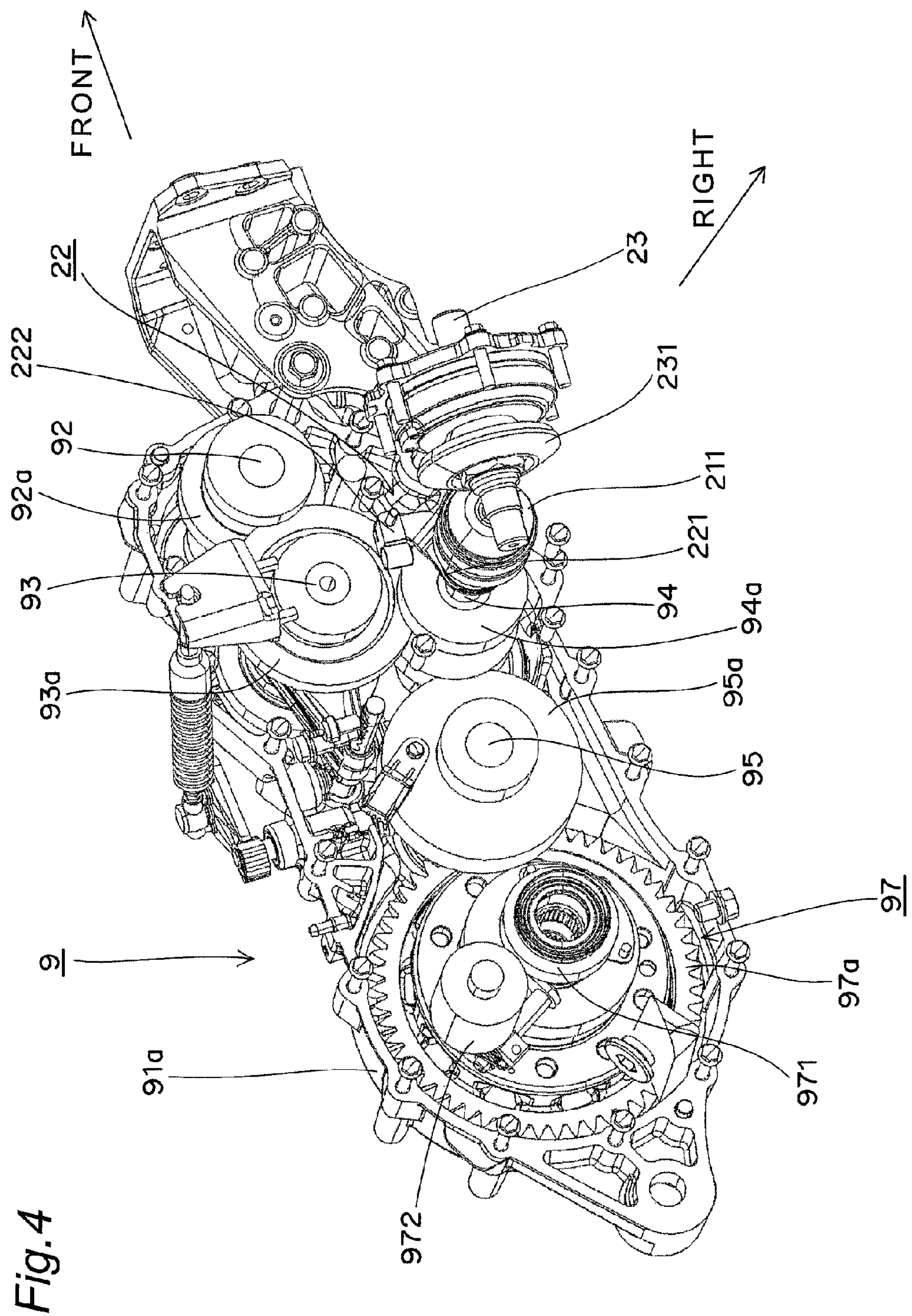
FIG. 4 is a perspective view showing an internal structure of the transmission.

FIG. 4 is a perspective view showing an internal structure of the transmission 9 from which the right mission case member 91*b* (FIG. 3) is detached. As shown in FIG. 4, in the transmission 9, an input shaft 92 to which the drive force from the engine 8 (FIG. 2) is inputted, an intermediate shaft 93 for transmitting the drive force of the input shaft 92, a front wheel drive output shaft 94 for transmitting the drive force to the front wheels 2, a rear wheel drive output shaft 95 for transmitting the drive force to the rear wheels 3, and a rear axle 96 (FIG. 2) are arranged in this order from the front side. A driven side pulley (not shown) of the belt converter 81 (FIG. 2) is attached to the input shaft 92. By a V belt looped over the driven side pulley and a drive side pulley (not shown) attached to an output shaft of the engine 8 (FIG. 2), the drive force from the engine 8 is inputted to the input shaft 92.

An input gear group 92*a*, an intermediate gear group 93*a*, and a front wheel drive output gear group 94*a* are respectively provided in the input shaft 92, the intermediate shaft 93, and the front wheel drive output shaft 94. By changing a meshing state between the gear groups, the drive force of the input shaft 92 is converted and transmitted to the front wheel drive output shaft 94. The drive force of the front wheel drive output shaft 94 is transmitted to a large diameter gear 97*a* of a final reduction mechanism 97 provided in the rear axle 96 (FIG. 2) via a rear wheel drive gear group 95*a* provided in the rear wheel drive output shaft 95. The drive force transmitted to the final reduction mechanism 97 is divided and transmitted into the left and right rear wheels 3 (FIG. 1) by a differential device 971. It should be noted that the input shaft 92, the intermediate shaft 93, the front wheel drive output shaft 94, the rear wheel drive output shaft 95, and the final reduction mechanism 97 are accommodated in the transmission case 91 (FIG. 3).

The final reduction mechanism 97 further includes a differential lock device 972, and the differential lock device 972 controls fixation and release of the differential device 971. When the differential device 971 is fixed by the differential lock device 972, differential of the left and right rear wheels 3 is fixed.

Figure 5:
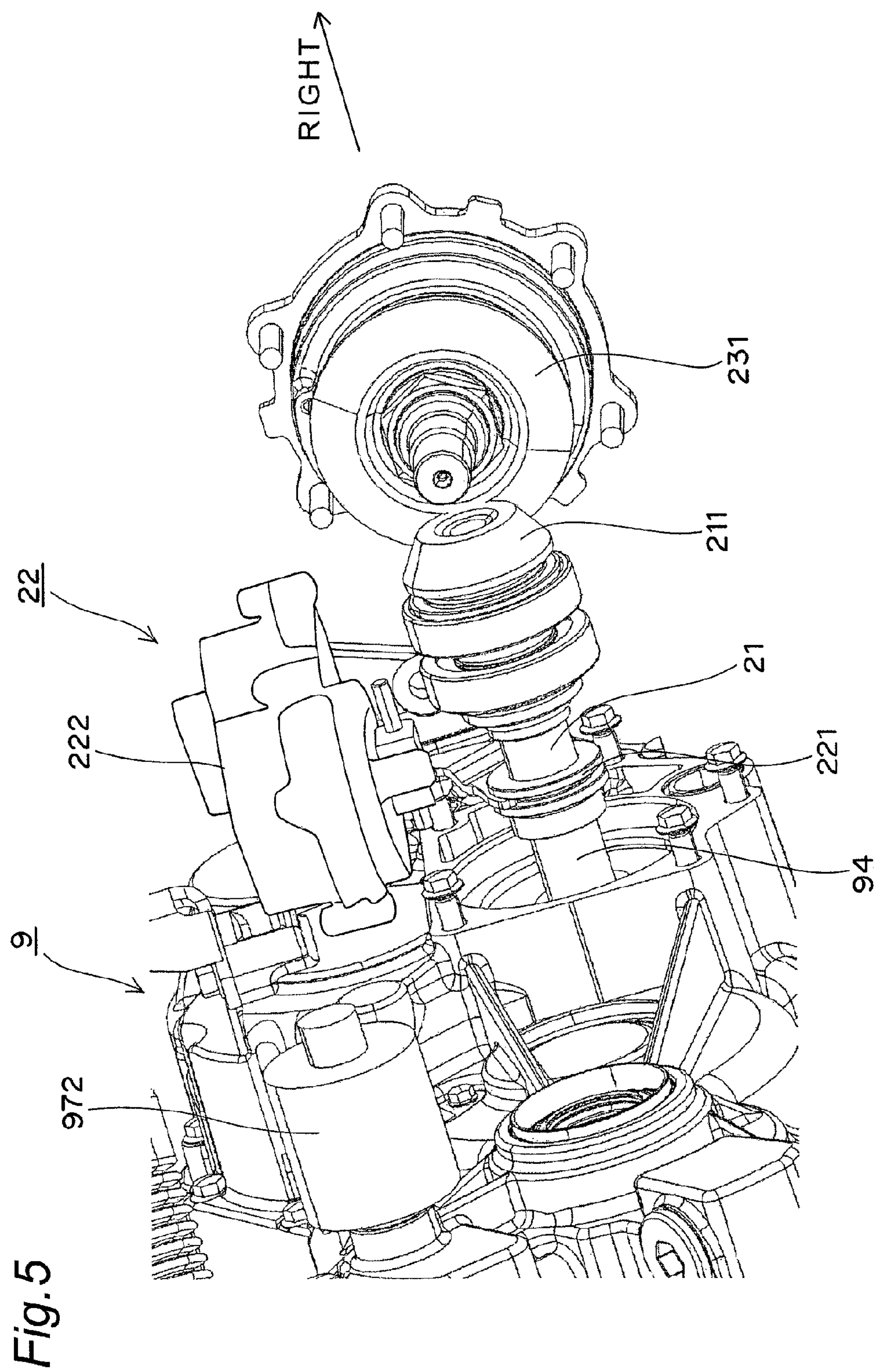
FIG. 5 is an enlarged view of a right end of a front wheel drive output shaft.

FIG. 5 is an enlarged view of a right end of the front wheel drive output shaft 94. As shown in FIGS. 4 and 5, a shaft 21 is provided on the right side of the front wheel drive output shaft 94. A two-wheel-four-wheel drive switching device 22 is attached to the mission case member 91*b* (FIG. 3) of the transmission case 91 (FIG. 3), and includes a two-wheel-four-wheel drive switching sleeve 221 spline-fitted to the front wheel drive output shaft 94 and the shaft 21 slidably in the axial direction, and an actuator 222 for moving the two-wheel-four-wheel drive switching sleeve 221 in the axial direction. The actuator 222 is electrically activated by a switch (not shown) provided in the vicinity of the driver seat. When the actuator 222 is activated, the two-wheel-four-wheel drive switching sleeve 221 is moved in the axial direction, so that the front wheel drive output shaft 94 and the shaft 21 are brought into a coupling state or a decoupling state. The actuator 222 is placed above the front wheel drive output shaft 94, the shaft 21, and the two-wheel-four-wheel drive switching sleeve 221.

A bevel gear 211 is provided in a right end of the shaft 21. A front wheel propeller shaft 23 (FIG. 4) for driving the front wheels 2 (FIG. 1) is extended in the front and rear direction, and formed by coupling a plurality of propeller shaft members via joints. A bevel gear 231 meshed with the bevel gear 211 is provided in a rear end of the front wheel propeller shaft 23 (FIG. 4), and rotation of the shaft 21 rotates the front wheel propeller shaft 23 (FIG. 4) via the bevel gear 211 and the bevel gear 231. As a result, the drive force of the front wheel propeller shaft 23 (FIG. 4) is transmitted to a front axle, so that the front wheels 2 (FIG. 1) are rotated.

Figure 6:
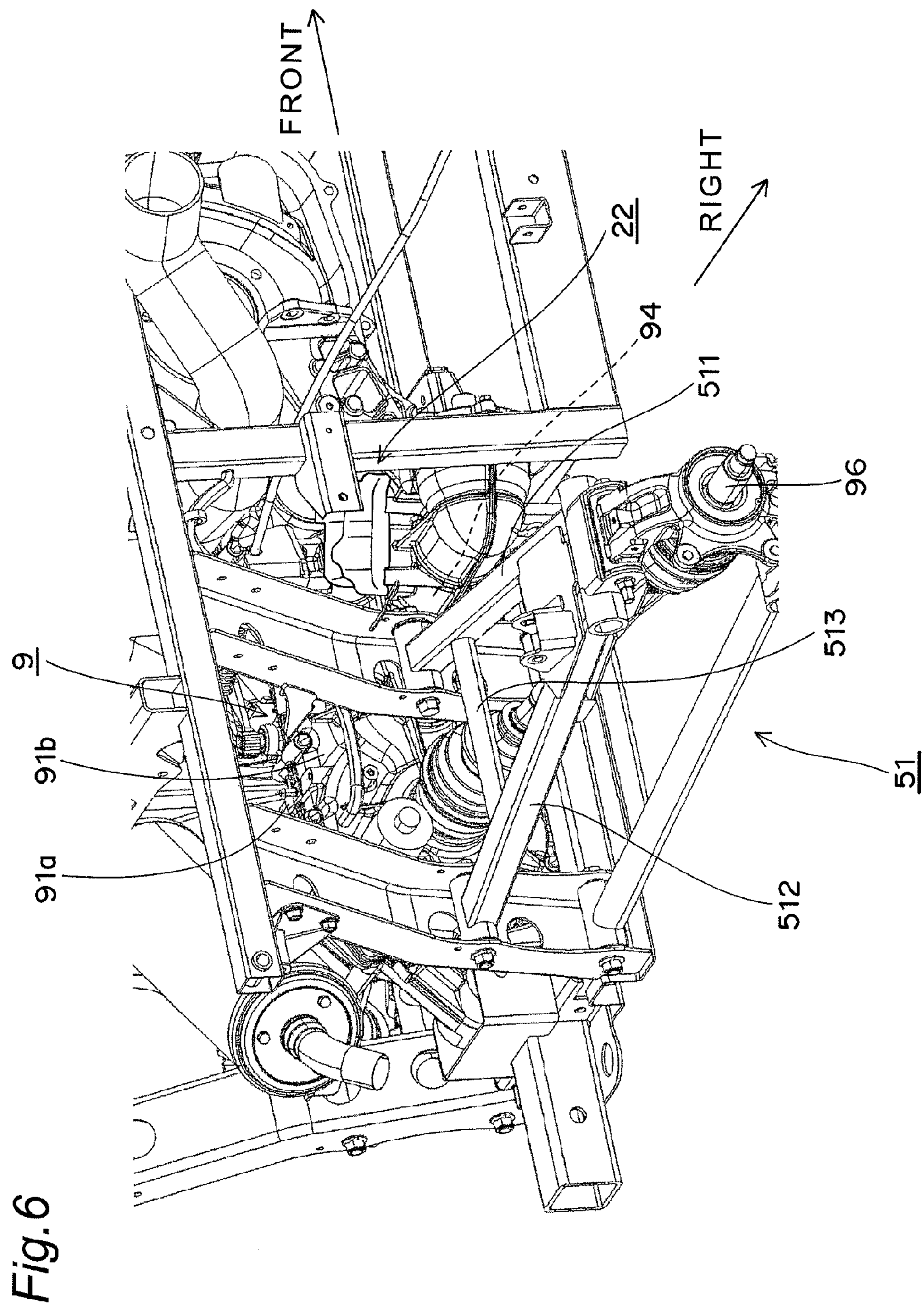
FIG. 6 is an enlarged view of a part of a rear axle.

FIG. 6 is an enlarged view of a part of the rear axle 96. As shown in FIG. 6, a pair of left and right rear wheel support arms 51 serving as an independent type rear wheel suspending device is attached to a side part of the vehicle body frame, so as to oscillatably support the rear wheels 3 (FIG. 1). The rear wheel support arms 51 have a substantially A shape in a top view and include upper and lower sets of front members 511, rear members 512, and coupling members 513 for coupling intermediate parts of the front members 511 and intermediate parts of the rear members 512. The front members 511 are placed between the front wheel drive output shaft 94 and the rear axle 96 in the front and rear direction, and the rear members 512 are placed behind the rear axle 96. That is, the front wheel drive output shaft 94 and the two-wheel-four-wheel drive switching device 22 are placed in front of the rear wheel support arms 51.

[Two-Wheel-Four-Wheel Drive Switching]

Hereinafter, two-wheel-four-wheel drive switching will be described.

In a two wheel drive mode in which the drive force of the engine 8 is not transmitted to the front wheels 2, when the driver presses the switch (not shown) provided in the vicinity of the driver seat, the electric actuator 222 is activated so as to move the two-wheel-four-wheel drive switching sleeve 221 in the axial direction (left direction). As a result, the front wheel drive output shaft 94 and the shaft 21 are coupled via the two-wheel-four-wheel drive switching sleeve 221, so that the drive force of the front wheel drive output shaft 94 is transmitted to the shaft 21. The drive force of the shaft 21 is transmitted to the front wheel propeller shaft 23 via the bevel gear 211 and the bevel gear 231. The drive force of the front wheel propeller shaft 23 is transmitted to the front axle, so that the front wheels 2 are rotated. As a result, the drive force of the engine 8 is transmitted to the front wheels 2 and the rear wheels 3, so that the utility vehicle 1 is operated in a four wheel drive mode.

In the four wheel drive mode in which the drive force of the engine 8 is transmitted to the front wheels 2, when the driver presses the switch provided in the vicinity of the driver seat, the electric actuator 222 is activated so as to move the two-wheel-four-wheel drive switching sleeve 221 in the axial direction (right direction). As a result, the front wheel drive output shaft 94 and the shaft 21 are decoupled, so that the drive force of the front wheel drive output shaft 94 is not transmitted to the shaft 21. As a result, the drive force of the engine 8 is transmitted only to the rear wheels 3, so that the utility vehicle 1 is operated in the two wheel drive mode.

According to the utility vehicle 1 with the above configuration, the following effects can be obtained.

(1) In a motive power transmission route between the front wheel drive output shaft 94 and the rear axle 96, the rear wheel drive output shaft 95 is provided. Thus, while ensuring a predetermined inter-shaft distance between the front wheel drive output shaft 94 and the rear axle 96, a gear diameter of the gear group provided in the front wheel drive output shaft 94 and a gear diameter of the gear group provided in the rear wheel drive output shaft 95 can be decreased. As a result, a size increase of the transmission 9 can be prevented.

(2) The two-wheel-four-wheel drive switching device 22 for freely coupling and decoupling the front wheel drive output shaft 94 and the front wheel propeller shaft 23 for driving the front wheels 2 is provided. Thus, the two-wheel-four-wheel drive switching of the utility vehicle 1 can be performed.

(2) The two-wheel-four-wheel drive switching device 22 is attached to the transmission case 91, that is, provided in the vicinity of the transmission case 91. Thus, in comparison to a case where the two-wheel-four-wheel drive switching device 22 is provided in the vicinity of the front wheels, a harness and the like serving as equipment relating to the switching device can be concentrated in the vicinity of the transmission 9. As a result, the equipment can be easily arranged. Since the two-wheel-four-wheel drive switching device 22 is electrically activated, the two-wheel-four-wheel drive switching can be easily performed in comparison to manual activation.

(3) The front wheel drive output shaft 94 and the two-wheel-four-wheel drive switching device 22 are provided so as to be placed in front of the rear wheel support arms 51 of the utility vehicle 1. Thus, contact between the front wheel drive output shaft 94 and the two-wheel-four-wheel drive switching device 22, and the rear wheel support arms 51 can be prevented.

(4) The final reduction mechanism 97 is provided in the rear axle 96, and the differential lock device 972 is provided in the final reduction mechanism 97. Thus, by the differential lock device 972, the differential of the rear wheels 3 is fixed, so that idling of the rear wheels at the time of no load can be prevented.

(5) The engine 8 and the transmission 9 are formed as separate bodies, and the input shaft 92, the front wheel drive output shaft 94, the rear wheel drive output shaft 95, and the final reduction mechanism 97 are accommodated in the transmission case 91. Thus, the shafts and the final reduction mechanism can be compactly arranged.

(6) The rear wheel support arms 51 oscillatably support the rear wheels 3. Thus, by the rear wheel support arms 51, a vibration transmitted from the rear wheels 3 to the vehicle body can be eased during running of the utility vehicle 1.

(7) The actuator 222 is placed above the front wheel drive output shaft 94 and the shaft 21. Thus, contact or mixture of foreign substances and the like with or into the actuator 222 can be suppressed.

In the above embodiment, one intermediate shaft 93 is provided. However, a plurality of intermediate shafts may be provided, or without an intermediate shaft, the input shaft 92 and the front wheel drive output shaft 94 may be coupled by a drive belt.

In the above embodiment, the differential device 971 and the differential lock device 972 are provided in the final reduction mechanism 97 of the rear axle 96. However, a differential device and a differential lock device may also be provided in the front axle.

In the above embodiment, the front seat 11 and the rear seat 12 are formed into a bench type. However, the seats may be formed into a box type.

Various modifications and changes can be made without departing from the spirit and the scope of the present invention described in the claims.

The invention claimed is:

1. A utility vehicle capable of switching between a two wheel drive mode for transmitting drive force to rear wheels and a four wheel drive mode for transmitting the drive force to front wheels and the rear wheels, the utility vehicle comprising:

a transmission that includes an input shaft to which the drive force from an engine is inputted, a front wheel drive output shaft for transmitting the drive force of the input shaft to the front wheels, and a rear axle for transmitting the drive force of the input shaft to the rear wheels, wherein a rear wheel drive output shaft is provided in a motive power transmission route between the front wheel drive output shaft and the rear axle;

a front wheel propeller shaft for driving the front wheels; and a two-wheel-four-wheel drive switching device for coupling and decoupling said front wheel drive output shaft and said front wheel propeller shaft;

wherein said front wheel drive output shaft and said rear wheel drive output shaft both extend in a lateral direction with respect to a front direction of the utility vehicle, and wherein said two-wheel-four-wheel drive switching device is on a lateral side of said front wheel drive output shaft.

2. The utility vehicle of claim 1, wherein said two-wheel-four-wheel drive switching device is attached to a side part of a transmission case and is electrically activated in response to a driver command.

3. The utility vehicle of claim 1, wherein said front wheel drive output shaft and said two-wheel-four-wheel drive switching device are provided so as to be forward of rear wheel support arms of the utility vehicle with respect to the front direction thereof.

4. The utility vehicle of claim 1, wherein a final reduction mechanism is provided in said rear axle and a differential lock device is provided in said final reduction mechanism.

5. The utility vehicle of claim 1, wherein the engine and the transmission are formed as separate bodies and the transmission comprises a transmission case accommodating said front wheel drive output shaft, said rear wheel drive output shaft and said final reduction mechanism.

6. A utility vehicle capable of switching between a two wheel drive mode for transmitting drive force to rear wheels and a four wheel drive mode for transmitting the drive force to front wheels and the rear wheels, the utility vehicle comprising:

an engine;

a transmission that includes an input shaft to which the drive force from said engine is inputted, a front wheel drive output shaft for transmitting the drive force of the input shaft to the front wheels, a rear axle for transmitting the drive force of the input shaft to the rear wheels, and a rear wheel drive output shaft between the front wheel drive output shaft and the rear axle so that drive force from said engine is transmitted to the rear wheels by way of said input shaft, said front wheel drive output shaft, said rear wheel drive output shaft and said rear axle;

a front wheel propeller shaft for driving the front wheels;

a two-wheel-four-wheel drive switching device for coupling and decoupling said front wheel drive output shaft and said front wheel propeller shaft;

wherein said front wheel drive output shaft and said rear wheel drive output shaft both extend in a lateral direction with respect to a front direction of the utility vehicle, and wherein said two-wheel-four-wheel drive switching device is on a lateral side of said front wheel drive output shaft.

7. The utility vehicle of claim 6, wherein said two-wheel-four-wheel drive switching device is attached to a side part of a transmission case and is electrically activated in response to a driver command.

8. The utility vehicle of claim 6, wherein said front wheel drive output shaft and said two-wheel-four-wheel drive switching device are provided so as to be forward of rear wheel support arms of the utility vehicle with respect to the front direction thereof.

9. The utility vehicle of claim 6, wherein a final reduction mechanism is provided in said rear axle and a differential lock device is provided in said final reduction mechanism.

10. The utility vehicle of claim 9, wherein the engine and the transmission are formed as separate bodies and the transmission comprises a transmission case accommodating said front wheel drive output shaft, said rear wheel drive output shaft and said final reduction mechanism.

* * * * *